US012782510B2

(12) United States Patent
Domokos et al.

(10) Patent No.: US 12,782,510 B2
(45) Date of Patent: Nov. 3, 2026

(54) DEVICE AND COMPUTER-IMPLEMENTED METHOD FOR TRAINING A FIRST ENCODER FOR MAPPING RADAR SPECTRA TO ENCODINGS, IN PARTICULAR ENCODINGS FOR TRAINING, TESTING, VALIDATING, OR VERIFYING A FIRST MODEL THAT IS CONFIGURED FOR OBJECT DETECTION, FOR EVENT RECOGNITION, OR FOR SEGMENTATION

(71) Applicant: Robert Bosch GmbH, Stuttgart (DE)

(72) Inventors: Csaba Domokos, Simmozheim (DE); Kilian Rambach, Stuttgart (DE); Mariia Pushkareva, Haifa (IL); Yuri Feldman, Haifa (IL); Asaf Gendler, Haifa (IL)

(73) Assignee: ROBERT BOSCH GMBH, Stuttgart (DE)

( * ) Notice: Subject to any disclaimer, the term of this patent is extended or adjusted under 35 U.S.C. 154(b) by 212 days.

(21) Appl. No.: 18/887,721

(22) Filed: Sep. 17, 2024

(65) Prior Publication Data

US 2025/0102625 A1 Mar. 27, 2025

(30) Foreign Application Priority Data

Sep. 27, 2023 (EP) .................................... 23200207

(51) Int. Cl.
*G01S 7/41* (2006.01)
*G01S 13/89* (2006.01)

(52) U.S. Cl.
CPC ............... *G01S 7/411* (2013.01); *G01S 13/89* (2013.01)

(58) Field of Classification Search
CPC ...... G01S 13/865; G01S 13/867; G01S 13/89; G01S 13/931; G01S 7/40; G01S 7/411;
(Continued)

(56) References Cited

U.S. PATENT DOCUMENTS 11,313,950 B2 * 4/2022 Kruglick ................ G06N 3/082
12,008,762 B2 * 6/2024 Agia ........................ G01S 17/42
(Continued)

OTHER PUBLICATIONS

Radford et al., "Learning Transferable Visual Models From Natural Language Supervision," Proceedings of the 38th International Conference on Machine Learning, PMLR 139, 2021, pp. 1-16. https://proceedings.mlr.press/v139/radford21a/radford21a.pdf Downloaded Sep. 17, 2024.

*Primary Examiner* — Peter M Bythrow
(74) *Attorney, Agent, or Firm* — NORTON ROSE FULBRIGHT US LLP

(57) ABSTRACT

A device and a computer-implemented method for training a first encoder for mapping radar spectra to encodings. The method includes providing the first encoder which is configured to map a radar spectrum to an encoding of the radar spectrum in a first feature space; providing a second encoder which is configured to map a digital image to an encoding of the digital image in the first features space; providing a first radar spectrum, and a first digital image, wherein the first radar spectrum and the first digital image represent the same or essentially the same real world scene; mapping the first radar spectrum with the first encoder to a first encoding; mapping the first digital image with the second encoder to a second encoding; and training the first encoder and/or the second encoder depending on a distance between the first encoding and the second encoding.

15 Claims, 5 Drawing Sheets

(58) Field of Classification Search
CPC ...... G01S 7/417; G06N 3/045; G06V 10/764; G06V 10/82; G06V 20/70
See application file for complete search history.

(56) References Cited

U.S. PATENT DOCUMENTS

| | | | | |
|---|---|---|---|---|
| 12,315,226 | B2 * | 5/2025 | Fazlali | G06V 10/7715 |
| 2020/0082219 | A1 * | 3/2020 | Li | G01C 21/3804 |
| 2020/0174112 | A1 | 6/2020 | Xing et al. | |
| 2023/0081171 | A1 * | 3/2023 | Zhang | G06T 11/00 382/157 |
| 2023/0087526 | A1 * | 3/2023 | Huang | G06V 10/774 382/156 |
| 2023/0305141 | A1 * | 9/2023 | Hong | G01S 7/412 |
| 2024/0112051 | A1 * | 4/2024 | Shen | G06N 20/00 |

* cited by examiner

DEVICE AND COMPUTER-IMPLEMENTED METHOD FOR TRAINING A FIRST ENCODER FOR MAPPING RADAR SPECTRA TO ENCODINGS, IN PARTICULAR ENCODINGS FOR TRAINING, TESTING, VALIDATING, OR VERIFYING A FIRST MODEL THAT IS CONFIGURED FOR OBJECT DETECTION, FOR EVENT RECOGNITION, OR FOR SEGMENTATION

CROSS REFERENCE

The present application claims the benefit under 35 U.S.C. § 119 of European Patent Application No. EP 23 20 0207.1 filed on Sep. 27, 2023, which is expressly incorporated herein by reference in its entirety.

FIELD

The present invention relates to a device and computer-implemented method for training a first encoder for mapping radar spectra to encodings, in particular encodings for training, testing, validating, or verifying a first model that is configured for object detection, for event recognition, or for segmentation.

BACKGROUND INFORMATION

U.S. Patent Application Publication Nos. US 2020/174112 A1 and US 2020/082219 A1 describe sensor fusion.

SUMMARY

A device and the computer-implemented methods according to certain features of the present invention insert information from digital images into a radar spectrum encodings for object detection, for event recognition, or for segmentation. According to an example embodiment of the present invention, a computer-implemented method is provided for training a first encoder for mapping radar spectra to encodings, in particular encodings for training, testing, validating, or verifying a first model that is configured for object detection, for event recognition, or for segmentation, wherein the method comprises providing the first encoder, wherein the first encoder is configured to map a first radar spectrum to a first encoding in a first feature space, providing a second encoder, wherein the second encoder is configured to map a first digital image to a second encoding in the first features space, providing the first radar spectrum, and the first digital image, wherein the first radar spectrum comprises a radar reflection of at least a part of a first object, wherein the first digital image depicts at least a part of the first object, wherein the first radar spectrum and the first digital image represent the same real world scene, preferably at the same time, mapping the first radar spectrum with the first encoder to the first encoding, mapping the first digital image with the second encoder to the second encoding, and training the first encoder and/or the second encoder depending on a distance between the first encoding and the second encoding. The example method includes providing a third encoder that is configured to map captions to encodings in the first feature space, providing a caption of the first digital image, mapping the caption of the first digital image with the third encoder to a third encoding in the first feature space, training the first encoder and/or the third encoder depending on a distance between the first encoding and the third encoding, wherein providing the caption of the first digital image comprises determining a semantic segmentation, wherein the semantic segmentation associates a first part, in particular a first pixel, or a first segment of pixel, of the first digital image, with a class name, providing a template for the caption, wherein the template comprises a part of a statement of the caption, and a first placeholder, and replacing the first placeholder in the template with the class name to create the statement According to an example embodiment of the present invention, the information from the first digital image is inserted in into the first model for object detection, for event recognition, or for segmentation. The third encoder is used for fine tuning. The second encoder may be a part of a pre-trained image-language model. The second encoder may be fine-tuned in the training along with the training of the first encoder. The statement with the class name is automatically created from the content of the first digital image or the second digital image. The third encoder may be a part of the pre-trained image-language model. The third encoder may be fine-tuned in the training along with the training of the first encoder.

According to an example embodiment of the present invention, providing the caption of the first digital image may comprise providing a set of class names, providing a set of categories, wherein at least one class name of the set of class names, is associated with at least one category of the set of categories, wherein providing the template comprises providing the template with the first placeholder for a category of the set of categories. Providing the caption of the first digital image may comprise associating at least one part, in particular at least one pixel, or at least one segment of pixel, of the first digital image with a class name of the set of class names, replacing the placeholder for the category with a first class name that is associated with the category, and that is associated with at least one part, in particular at least one pixel, or at least one segment of pixel, of the first digital image, to create a first statement of the caption of the first digital image, and replacing the placeholder for the category with a second class name that is associated with the category, and that is associated with at least one part, in particular at least one pixel, or at least one segment of pixel, of the first digital image to create a second statement of the caption of the first digital image. Providing the caption of the second digital image may comprise associating at least one part, in particular at least one pixel, or at least one segment of pixel, of the second digital image with a class name of the set of class names, replacing the placeholder for the category with a first class name that is associated with the category, and that is associated with at least one part, in particular at least one pixel, or at least one segment of pixel, of the second digital image, to create a first statement of the caption of the second digital image, and replacing the placeholder for the category with a second class name that is associated with the category, and that is associated with at least one part, in particular at least one pixel, or at least one segment of pixel, of the second digital image to create a second statement of the caption of the second digital image. This means, multiple statements comprising different class names of the same category are automatically generated from the same template.

According to an example embodiment of the present invention, providing the first digital image may comprise providing depth information that is associated with the pixels of the first digital image, wherein providing the caption of the first digital image comprises providing a set of attributes that describe a position of an object relative to another object that is depicted in the first digital image, determining a position of the first object relative to another object that is depicted in the first digital image, depending on the depth information that is associated with at least a part of the pixels that depict the first object and the depth information that is associated with at least a part of the pixels that depict the other object, selecting an attribute from the set of attributes depending on the position, providing the template with two first placeholders a second placeholder for an attribute of the set of attribute, replacing the second placeholder with the attribute, and the two first placeholders with the class name of the first object, and the other object respectively. The depth information improves the caption of the first digital image further.

According to an example embodiment of the present invention, providing the second digital image may comprise providing depth information that is associated with the pixels of the second digital image, wherein providing the caption of the second digital image comprises providing a set of attributes that describe a position of an object relative to another object that is depicted in the second digital image, determining a position of the second object relative to another object that is depicted in the second digital image, depending on the depth information that is associated with at least a part of the pixels that depict the second object and the depth information that is associated with at least a part of the pixels that depict the other object, selecting an attribute from the set of attributes depending on the position, providing the template with two first placeholders a second placeholder for an attribute of the set of attribute, replacing the second placeholder with the attribute, and the two first placeholders with the class name of the first object, and the other object respectively. The depth information improves the caption of the second digital image further.

According to an example embodiment of the present invention, providing the caption may comprise providing a set of templates for statements, wherein the templates in the set of templates comprise the first placeholder and a part of a respective statement, and selecting the template for the caption from a set of templates in particular randomly. This means, the set of statements comprises statements that are different from each other, and the statement that is used is randomized.

According to an example embodiment of the present invention, the method may comprise mapping the first radar spectrum with a first part of the first model that is configured to map radar spectra to encodings in a second feature space to a first encoding in the second feature space, mapping the first encoding in the first feature space with a second model that is configured to map encodings in the first features space to encodings in the second feature space to a second encoding in the second feature space, mapping the first encoding in the second feature space and the second encoding in the second features space with a second part of the first model to an output of the first model, providing a ground truth for the output, training the first model depending on difference between the output and the ground truth, wherein the output and the ground truth characterizes at least one object that is detected in the radar spectrum, or an event that is recognized in the radar spectrum, or a segmentation of the radar spectrum. This trains the first model based on the first digital image, or a, in particular previously unseen, third digital image, with the conserved information from digital images that were used to train the first encoder.

According to an example embodiment of the present invention, the method may comprise mapping the second digital image with a first part of the first model that is configured for mapping digital images to encodings in a second feature space to a first encoding in the second feature space, mapping the first encoding with a second model that is configured to map encodings from the first feature space to encodings in the second feature space to a second encoding in the second features space, mapping the first encoding in the second feature space and the second encoding in the second features space with a second part of the first model to an output of the first model, providing a ground truth for the output, training the first model depending on difference between the output and the ground truth, wherein the output and the ground truth characterizes at least one object that is detected in the radar spectrum, or an event that is recognized in the radar spectrum, or a segmentation of the radar spectrum. This trains the first model based on the second digital image with conserved information from digital images that were used to train the first encoder.

According to an example embodiment of the present invention, the method may comprise providing a third radar spectrum, mapping the third radar spectrum with the first encoder to an encoding of the third radar spectrum in the first feature space, mapping the third radar spectrum with a first part of the first model that is configured to map radar spectra to encodings in a second feature space to a first encoding in the second feature space, mapping the encoding of the third radar spectrum in the first feature space with a second model 410 that is configured to map encodings in the first features space to encodings in the second feature space to a second encoding in the second feature space, mapping the first encoding in the second feature space and the second encoding in the second features space with a second part of the first model to an output of the first model, providing a ground truth for the output, training the first model depending on difference between the output and the ground truth, wherein the output and the ground truth characterizes at least one object that is detected in the radar spectrum, or an event that is recognized in the radar spectrum, or a segmentation of the radar spectrum.

The first model may be trained on a previously unseen radar spectrum.

According to an example embodiment of the present invention, the method may comprise capturing the first radar spectrum with a radar sensor, mapping the first encoding in the first feature space with the second model to a first encoding in the second features space, mapping the first radar spectrum with the part of the first model to a second encoding of the first radar spectrum in the second features space, mapping the first encoding of the first radar spectrum in the second feature space and the second encoding of the first radar spectrum in the second feature space with the second part of the first model to the output of the first model that characterizes at least one object that is detected in the first radar spectrum, in particular a traffic sign, a road surface, a person, a pedestrian, an animal, a plant, a vehicle, a road object, a building, or that characterizes an event that is recognized in the first radar spectrum, in particular a state of a traffic sign, a gesture of a person, or that characterizes a segmentation of the spectrum, in particular with respect to a traffic sign, a road surface, a pedestrian, an animal, a vehicle, a road object, a building. This means, the first radar spectrum is analyzed based on the conserved information from the digital images that the first encoder was trained with.

According to an example embodiment of the present invention, the method may comprise operating, in particular moving or stopping, a technical system, in particular a computer-controlled machine, preferably a robot, a vehicle, a manufacturing machine, a household appliance, a power tool, an access control system, a personal assistant, a medical imaging system. This means, the technical system is operated based on the conserved information from the digital images that the first encoder was trained with.

According to an example embodiment of the present invention, the device for training the first encoder for mapping radar spectra to encodings, in particular encodings for training, testing, validating, or verifying the first model that is configured for object detection, for event recognition, or for segmentation, comprises at least one processor, and at least one memory, wherein the at least one processor is configured to execute instructions that, when executed by the at least one processor, cause the device to perform steps of the method, wherein the at least one memory is configured to store the instructions.

According to an example embodiment of the present invention, the device may comprise a radar sensor that is configured to capture a radar spectrum, wherein the device is configured to determine an output of the first model that characterizes at least one object that is detected in the spectrum, in particular a traffic sign, a road surface, a person, a pedestrian, an animal, a plant, a vehicle, a road object, a building, or that characterizes an event that is recognized in the spectrum, in particular a state of a traffic sign, a gesture of a person, or that characterizes a segmentation of the spectrum, in particular with respect to a traffic sign, a road surface, a pedestrian, an animal, a vehicle, a road object, a building, and to operate, in particular move or stop, a technical system, in particular a computer-controlled machine, preferably a robot, a vehicle, a manufacturing machine, a household appliance, a power tool, an access control system, a personal assistant, a medical imaging system, depending on the output.

A computer program comprises computer-readable instructions, that when executed by a computer, cause the computer to execute the method of the present invention.

Further embodiments are derivable from the following description and the figures.

DETAILED DESCRIPTION OF EXAMPLE EMBODIMENTS

Figure 1:
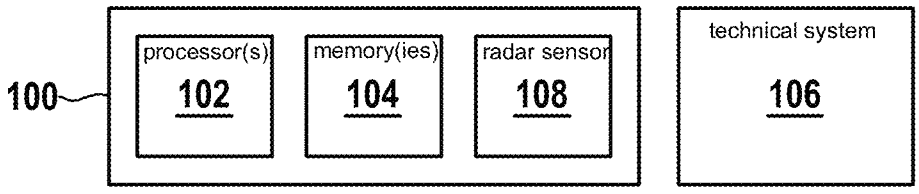
FIG. 1 schematically depicts a device for training a first encoder for mapping radar spectra to encodings, in particular encodings for training, testing, validating, or verifying a first model that is configured for object detection, for event recognition, or for segmentation, according to an example embodiment of the present invention.

FIG. 1 schematically depicts a device 100.

The device 100 comprises at least one processor 102, and at least one memory 104.

The at least one processor 102 is configured to execute instructions that, when executed by the at least one processor 102, cause the device 100 to perform steps of a method for training an encoder for mapping radar spectra to encodings, in particular encodings for training, testing, validating, or verifying a model that is configured for object detection, for event recognition, or for segmentation. The at least one memory 104 is configured to store the instructions.

The device 100 is configured to determine an output of the model.

The device 100 is configured to operate, in particular move or stop, a technical system 106, depending on the output of the model.

The technical system 106 is for example a computer-controlled machine, preferably a robot, a vehicle, a manufacturing machine, a household appliance, a power tool, an access control system, a personal assistant, or a medical imaging system.

The device 100 may comprise a radar sensor 108 that is configured to capture a radar spectrum.

The output may characterize at least one object that is detected in the spectrum. The object may be a traffic sign, a road surface, a person, a pedestrian, an animal, a plant, a vehicle, a road object, a building.

The output may characterize an event that is recognized in the spectrum. The event may be a state of a traffic sign, or a gesture of a person.

The output may characterize a segmentation of the spectrum. The segmentation may be with respect to a traffic sign, a road surface, a pedestrian, an animal, a vehicle, a road object, a building.

Figure 2:
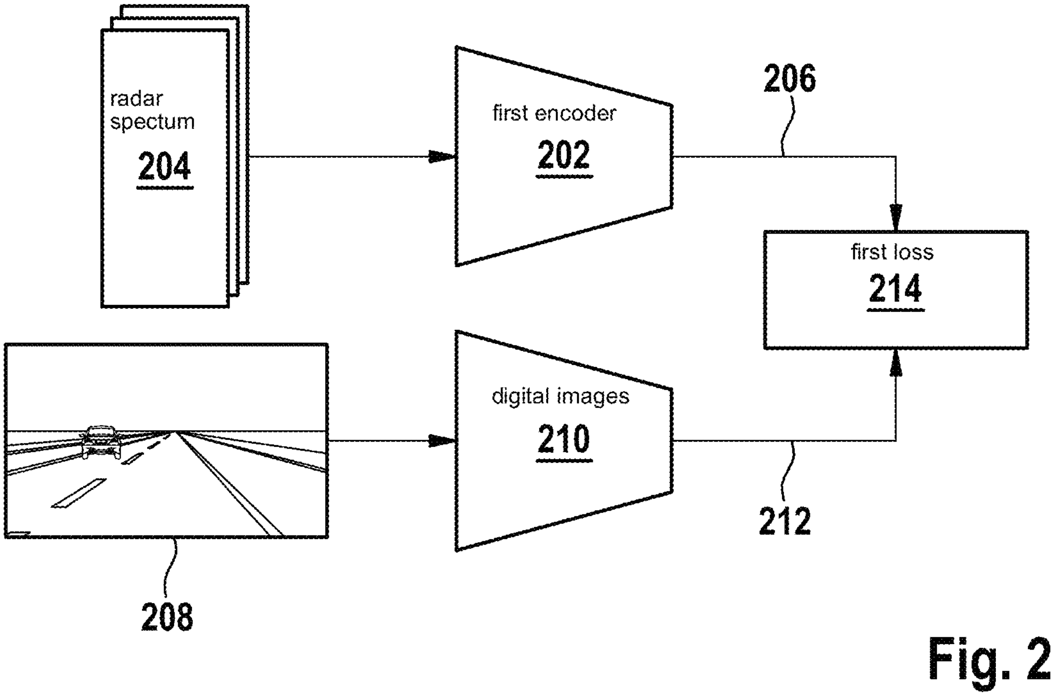
FIG. 2 schematically depicts a first part of a training of the first encoder, according to an example embodiment of the present invention.

FIG. 2 schematically depicts a first part of a training of a first encoder 202 for mapping a radar spectrum 204 to an encoding 206 in a first feature space. The first part of the training comprises mapping a digital image 208 with a second encoder 210 to a second encoding 212 in the first feature space.

The first part of the training is based on a first loss 214.

Denoting the radar spectra as S, and the digital images 210 as I, the first part of the training is based on training data $\{(I_i, S_i)\}$ that comprises pairs of a respective radar spectrum 204 denoted as $S_i$ and a respective digital image denoted as $I_i$.

Denoting the first encoder 202 as h, and denoting the second encoder 208 as f, the first loss 214 is for example a loss function L that depends on a distance between the first encoding 206 and the second encoding 212 that the radar spectrum 204 and the digital image 210 of one pair are mapped to. Examples for the loss function L are:

$$L = \sum_i \|f(I_i) - h(S_i)\|^2$$

$$L = -\sum_i \frac{f(I_i) \cdot h(S_i)}{\|f(I_i)\| \|h(S_i)\|}$$

$$L = -\Sigma(\log(p_i) + \log(q_i))$$

$$L = -\Sigma w_i(\log(p_i) + \log(q_i))$$

-continued $$L = -\Sigma((1 - p_i)^\gamma \log(p_i) + (1 - q_i)^\gamma \log(q_i))$$

$$p_i = \text{softmax}\big(f(I_i)^T h(S)\big)$$

$$q_i = \text{softmax}\big(h(S_i)^T f(I)\big)$$

wherein

Figure 3:
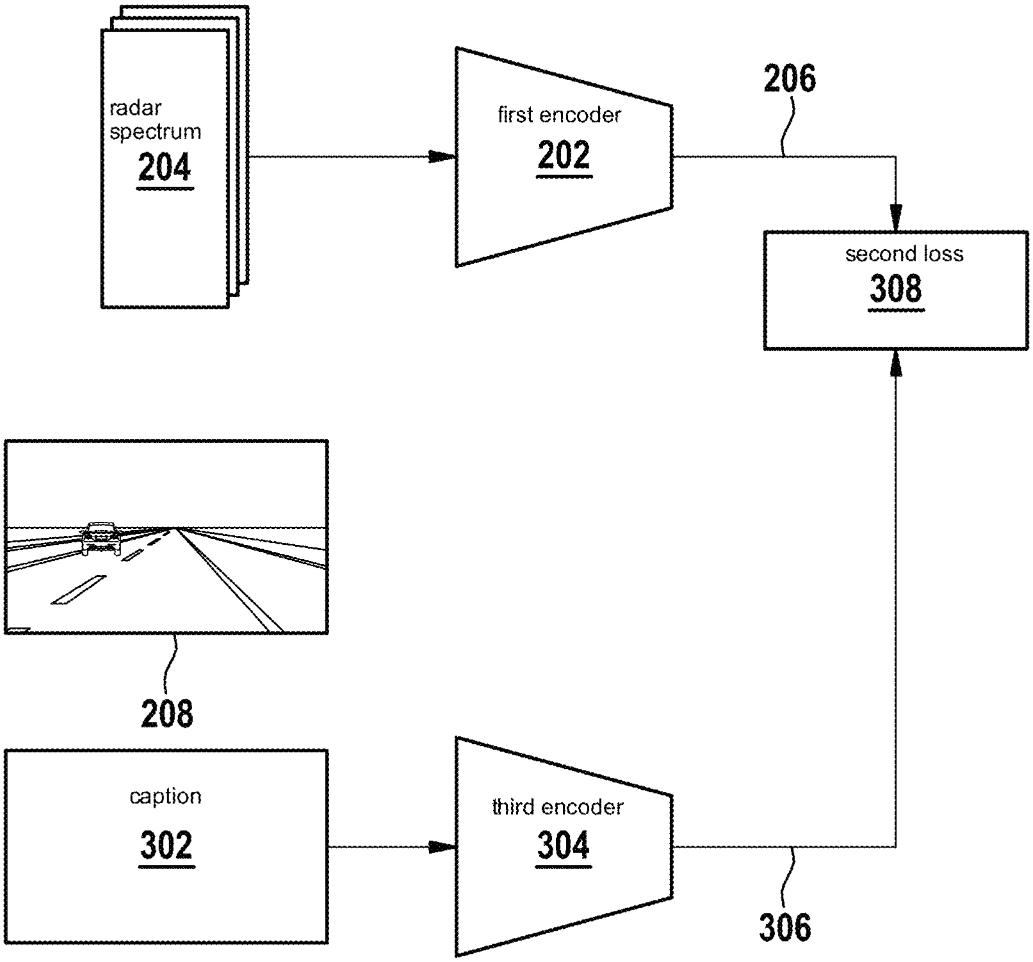
FIG. 3 schematically depicts a second part of the training of the first encoder, according to an example embodiment of the present invention.

FIG. 3 schematically depicts a second part of the training of the first encoder 202. The second part of the training comprises mapping the radar spectrum 204 to the encoding 206 in the first feature space. The second part of the training comprises mapping a caption 302 of the digital image 208 with a third encoder 304 to a third encoding 306 in the first feature space.

The first part of the training is based on a second loss 308. The second loss 308 depends on a distance between the first encoding 206 and the third encoding 306. The second loss 308 is for example a cosine similarity of the first encoding 206 and the third encoding 306.

Figure 4:
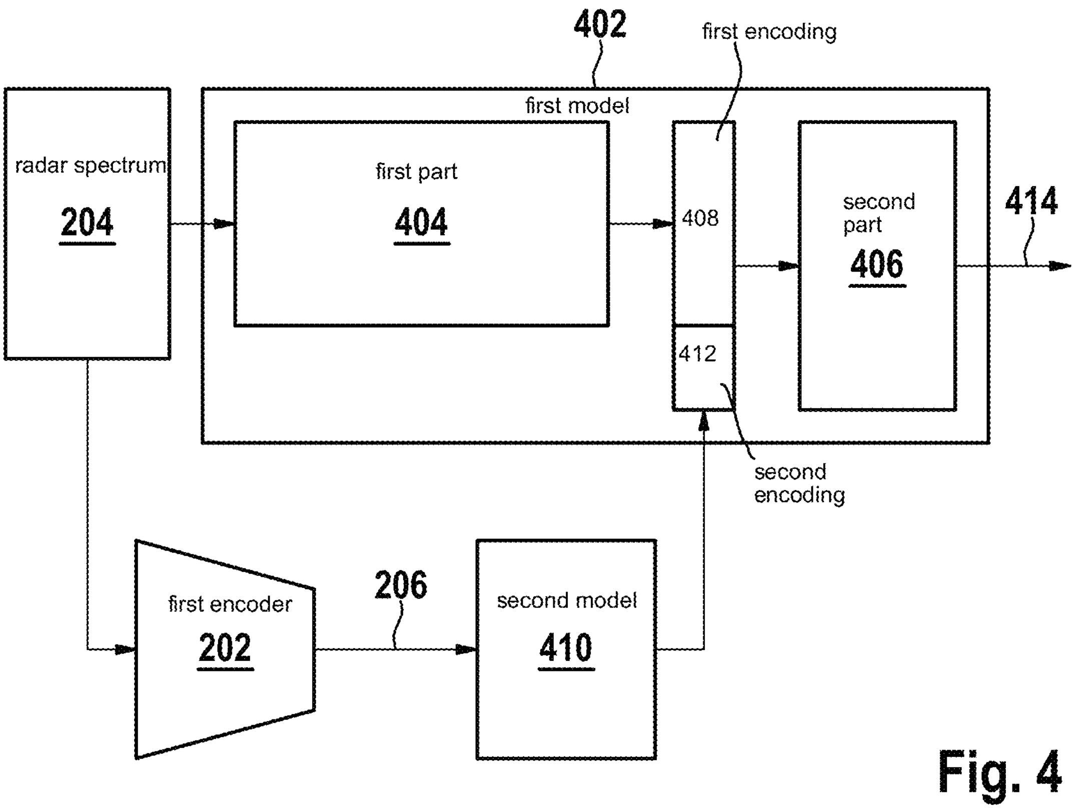
FIG. 4 schematically depicts a training of the first model, according to an example embodiment of the present invention.

FIG. 4 schematically depicts a training of a first model 402 that is configured for object detection, for event recognition, or for segmentation. The first model 402 comprises a first part 404 and a second part 406.

The first part 404 of the first model 402 is configured to map the first radar spectrum 204 to a first encoding 408 in a second feature space.

The training of the first model 402 comprises mapping the first radar spectrum 204 to the first encoding 206 in the first feature space.

The first feature space and the second feature space may be of the same dimensions. The first feature space and the second feature space may have different dimension.

Optionally, in particular when the first features space and the second feature space have different dimensions, a second model 410 is configured to map the first encoding 206 from the first feature space to a second encoding 412 in the second feature space.

The training of the first model 402 comprises mapping the first encoding 408 in the second feature space and the second encoding 412 in the second features space with the second part 406 of the first model 402 to an output 414 of the first model 402.

The second part of the training comprises providing a ground truth for the output and training the first model 402 depending on a difference between the output 414 and the ground truth.

The output 414 and the ground truth characterizes at least one object that is detected in the first radar spectrum 204, or an event that is recognized in the first radar spectrum 204, or a segmentation of the first radar spectrum 204.

Figure 5:
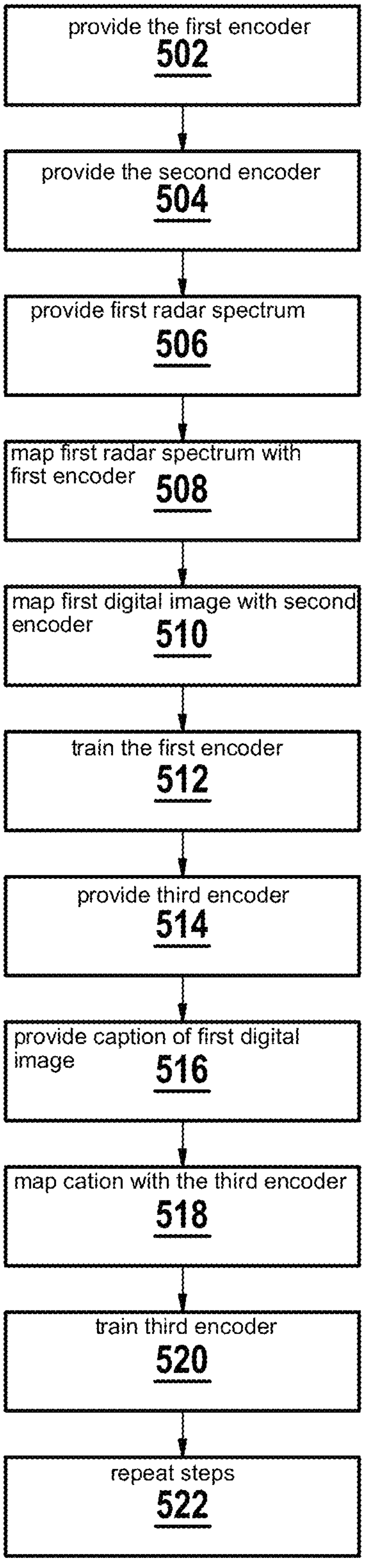
FIG. 5 depicts a flowchart of a method for training a first encoder for mapping radar spectra to encodings, according to an example embodiment of the present invention.

FIG. 5 depicts a flowchart comprising steps of a method for training the first encoder 202 for mapping radar spectra to encodings. The encodings may be used for training, testing, validating, or verifying the first model 402.

The training, testing, validating, or verifying are described by way of example of the first radar spectrum 204, the first digital image 208, and the caption 302 of the first digital image 208. The first part of the training and the second part of the training may use different pairs of a radar spectrum and a digital image. Some of the pairs may be used in both parts of the training, others not. The training of the first model 402 may use the same or different pairs of a radar spectrum and a digital image than the first part and/or the second part of the training. The radar spectrum and the digital image in a pair that is used in the training represent the same or essentially the same real-world scene and preferably have been captured at the same time, or essentially the same time.

According to an example, training batches are selected from driving datasets. A driving dataset comprises a sequence of frames of radar spectra and digital images. According to an example, the training batches are selected in a way that no two frames that are less than T seconds apart are chosen for the same batch, with T a parameter.

The method comprises a step 502.

The step 502 comprises providing the first encoder 202.

The method comprises a step 504.

The step 504 comprises providing the second encoder 210.

The second encoder 210 is for example pre-trained.

The method comprises a step 506.

The step 506 comprises providing the first radar spectrum 204 and the first digital image 208.

The first radar spectrum 204 comprises a radar reflection of at least a part of a first object.

The first digital image 208 depicts at least a part of the first object.

The first radar spectrum 204 and the first digital image 208 represent the same or essentially the same real-world scene, preferably at the same time, or essentially the same time.

The first digital image 208 may be provided with depth information that is associated with the pixels of the first digital image 208. The depth information may be provided by a LiDAR sensor.

The method comprises a step 508.

The step 508 comprises mapping the first radar spectrum 204 with the first encoder 202 to the first encoding 206.

The method comprises a step 510.

The step 510 comprises mapping the first digital image 208 with the second encoder 210 to the second encoding 212.

The method comprises a step 512.

The step 512 comprises training the first encoder 202 depending on the distance between the first encoding 206 and the second encoding 212. The step 512 may comprises training the second encoder 210 depending on the distance between the first encoding 206 and the second encoding 212. The second encoder 210 is for example fine-tuned depending on the distance between the first encoding 206 and the second encoding 212.

The training may comprise repeating the steps 502 to 512 for a plurality of pairs of a first radar spectrum and a first digital image. The training may comprise evaluating the first loss 214, e.g., one of the exemplary loss functions.

The method may end after step 512 with a pretrained first encoder 204.

The method may comprise a step 514.

The method may start with the step 514 and a pretrained first encoder 204.

The step 514 comprises providing the third encoder 304.

The third encoder 304 is for example configured to classify a set of class names depending on a template for the caption 302. The template for the caption 302 for example comprises a part of a statement of the caption 302, and at least one placeholder. According to an example, the statement comprises a placeholder for a class name. According to an example, the third encoder 304 is configured to output an classification for the class names in set of class names regarding a likelihood that the placeholder shall be replaced with the respective class name, wherein the third encoding 306 represents the classification.

The third encoder 304 is for example pre-trained.

The method comprises a step 516.

The step 516 comprises providing the caption 302 of the first digital image 208.

The caption 302 comprises at least one statement that describes at least one object that is depicted in the first digital image 208. The statement in the example comprises text.

A statement may be determined depending on a template for the caption 302.

The statement is for example determined by replacing the placeholder in the template with the class name to create the statement.

The class name may be selected from the set of class names depending on a semantic segmentation of the first digital image 208 that associates a part of the first digital image 208 with the class name. The part of the first digital image 208 may be a pixel, or a segment of pixel. According to an example, the second encoder 210 is configured to output a classification for the class names in set of class names regarding a likelihood that the placeholder shall be replaced with the respective class name, wherein the second encoding 212 represents the classification.

For example, the class name with the largest combined likelihood is selected from the set of class names in a multi-modal embedding space for the classification represented by the second encoding 212 and the classification represented by the third encoding 306.

The second encoder 210 and the third encoder 304 may be jointly trained to predict correct pairings of a batch of (digital image, caption) training examples.

The class names in the set of class names may be associated with a respective category of a set of categories.

For example, the set of categories comprises vehicle, infrastructure, vegetation, pedestrian, background.

For example, the set of class names comprises road, sidewalk, building, wall, fence, pole, traffic light, traffic sign, terrain, sky, person, rider, car, truck, bus, train, motorcycle, bicycle, tree, grass.

An exemplary association of class names to categories is:

vehicle: car, truck, bus, train, motorcycle, bicycle infrastructure: road, sidewalk, building, wall, fence, pole vegetation: tree, grass animal: dog, cat, horse, bird pedestrian: person, rider background: sky, terrain The placeholder may be a placeholder for a category from the set of categories. This means, the placeholder may be replaced with any class name from the set of class names that is associated with the category.

According to an example, the semantic segmentation associates a first part of the digital image 208 with a first class name and a second part of the digital image 208 with a second class name from the set of class names. According to an example, the first class name and the second class name are associated with the category.

The placeholder for the category may be replaced with the first class name ant the second class name. The caption 302 may comprise two statements, one that is created by replacing the placeholder for the category with the first class name, and one that is created by replacing the placeholder for the category with the second class name.

The caption 302 may comprise at least one attribute. The attribute may be selected from a set of attributes that describe a position of an object relative to another object that is depicted in the first digital image 208.

For example, the digital image depicts the first object and the other object. A position of the first object relative to the other object may be determined depending on the depth information that is associated with at least a part of the pixels that depict the first object and the depth information that is associated with at least a part of the pixels that depict the other object.

The attribute that describes the position is selected from the set of attributes depending on the position.

The template may comprise two first placeholders a second placeholder for an attribute of the set of attributes.

The second placeholder may be replaced with the attribute, and the two first placeholders may be replace with the class name of the first object, and the other object respectively.

Providing the caption 302 may comprise providing a set of templates for statements, wherein the templates in the set of templates comprise the first placeholder and a part of a respective statement, and selecting the template for the caption 302 from a set of templates in particular randomly.

An exemplary caption generation process for an exemplary digital image may comprise determining the semantic segmentation of the exemplary digital image. The exemplary digital image may comprise depth information, e.g., provided by a LiDAR sensor.

The semantic segmentation may be determined with a neural network, that is pretrained for semantic segmentation.

The semantic segmentation for example is for example an output segmentation that assigns category names and/or class names to objects that may be infrastructure, or environment, e.g., buildings, walls, vegetation, and to objects that may be actors, e.g., cars, pedestrians. The semantic segmentation is for example configured for perception of a driving scene.

The output segmentation is for example filtered according to the following criteria. Filtering refers to ignoring or discarding segments in the segmentation that do not match the criteria in the further steps of the caption generation process.

Confidence: a threshold on per-pixel classification confidence may be used to discard or ignore pixels with confidence that is lower than a threshold.

Stability of neural network output: multiple forward passes may be performed with the neural network for an input that is based on the exemplary digital image, wherein different i.i.d. samples of Gaussian noise are added to the exemplary digital image to create the input. The exemplary digital image may be used in the multiple forward passes without noise as well. This results in a per-pixel distribution of classification vectors characterizing the stability of the segmentation network output in the vicinity of the exemplary digital image. The per-pixel distribution may be approximated with a Gaussian distribution. A maximum threshold on the covariance and a minimum threshold on the probability of the output class name may be set, in order to discard or ignore the segmentation output if the covariance of the multiple forward passes exceeds the maximum threshold, or if the probability of the output class name is less than the minimum threshold.

Physical size of a segment:—a minimum size threshold for the size of the segment may be defined. The minimum size may be assigned per-class name. The physical size of the segment is for example determined using the depth information for the exemplary digital image.

A maximum size threshold may not be defined, since a single segment may comprise multiple objects of the same class, and thus violate such maximum threshold.

The exemplary caption generation process may comprise collecting category names that correspond to the segments which were not discarded in the previous step.

The exemplary caption generation process may comprise constructing the caption 302 by applying a randomized template to the detected categories, in the following manner:

An overall structure of the statements in the caption 302 is randomized from the set of templates, including (but not limited) to:

A photo of a { }
A [quality] photo of a { }
A rendering of a { }
A snapshot of the { }
There are { } in the scene
There is { } in the scene
This is a depiction of { }
The scene comprises { }
Photo of a driving scene with { } wherein [quality] is a placeholder for an attribute, e.g., one of bad, good, blurred, clean, cropped, close-up, nice, big, small.

where { } is a placeholder for a listing of a content of the exemplary digital image.

The placeholder { } for the listing is for example replaced, as described below:

A random category of the collected categories is chosen, and the class names that are associated with the chosen category are concatenated separated with commas and randomly added.

In a statement using the part "there is { }", or "there are { }" the placeholder { } is replaced by the text that replaced the placeholder in a statement that has already be created for the caption 302.

A random category of the collected categories may be selected, that fulfills the following additional criteria:

- at least two different classes are associated with the category, and at least one segment in the exemplary digital image is associated with each of the at least two classes; or
- a class name is associated with the category, and at least two segments in the exemplary digital image are associated with the class name.

The placeholder { } is replaced with text that comprises the name of the category that fulfills the additional criteria, e.g., "a group of [category name]" or "multiple [category name]". According to an example, the category name is used only if the physical size of segments surpasses a per-category threshold.

The placeholder { } may comprise at least one class name or at least one category name, and be amended with a geometric relation, based on a three-dimensional location of the segments in the real world, e.g., with respect to a camera, that captured the exemplary digital image. The geometric relation may be "further back", "to the left", "to the right" according to the detected geometric relation in real world. The geometric relation may be determined depending on the depth associated with pixels in the respective segments of the exemplary digital image.

The geometric relation may comprise a numerical expression or a distance, e.g., "there is a car <N> meters in front", or "there is a car <M> meters to the left", "there is a car <M> meters to the right".

The filtering the output segmentation, based on physical object size, the stability and/or confidence improves the resulting caption 302. The caption 302 is based on object types and when using the depth also based on the scene geometry.

The randomization of diverse caption templates automatically produces the caption 302 for the individual scene components.

This enables a massive randomization of captions during contrastive training.

This requires no human prompt tuning or annotations, or paid access to pretrained models.

The exemplary caption generation process may comprise constructing the caption 302 to additionally comprise an output of an image captioning model.

For example, image portions corresponding to chosen segments may be mapped with the image captioning model, e.g., as transformer input tokens. For example, the output of the image captioning model is then concatenated to the caption 302 obtained according to the steps above.

This tends to produce captioning output that is better focused on objects of interest.

The caption 302 may be determined for the digital images that are used for training the first encoder 204. The randomizing may be performed during training, while the other steps of the process for generating the caption 302 may be performed before the training for the digital images that are used for the training.

The method comprises a step 518.

The step 518 comprises mapping the caption 302 of the first digital image 208 with the third encoder 304 to the third encoding 306 in the first feature space.

The method comprises a step 520.

The step 520 comprises training the first encoder 202 depending on the distance between the first encoding 206 and the third encoding 306.

The step 520 may comprises training the third encoder 304 depending on the distance between the first encoding 206 and the third encoding 306. The third encoder 304 is for example fine-tuned depending on the distance between the first encoding 206 and the third encoding 306.

The training may comprise repeating the steps 514 to 520 for a plurality of pairs of a first radar spectrum and a first digital image. The training may comprise evaluating the second loss 308, e.g., the cosine similarity.

The method ends after step 520 with a trained first encoder 204.

Figure 6:
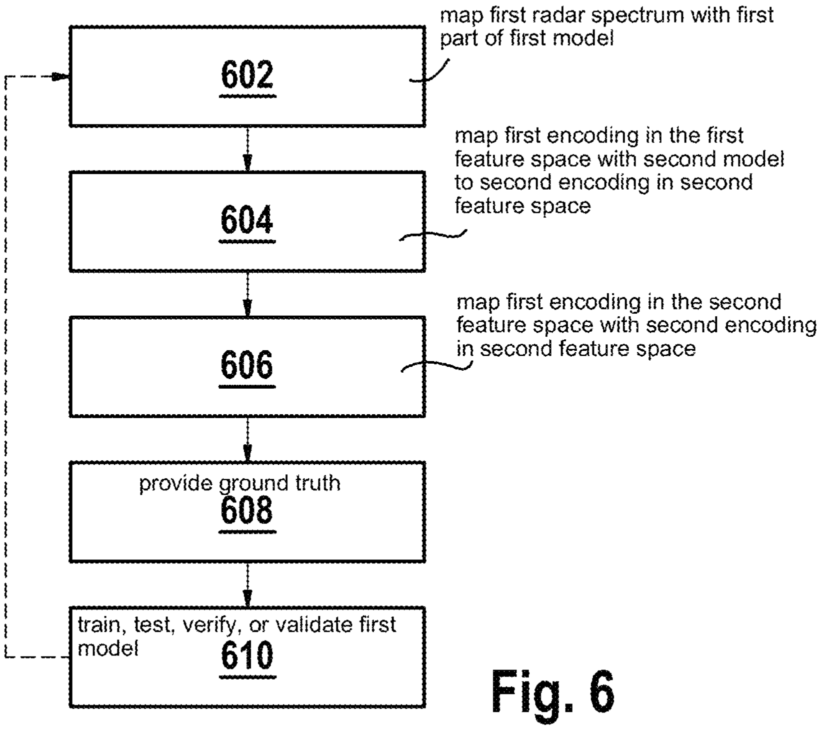
FIG. 6 depicts a flowchart of a method for training, testing, validating, or verifying the first model, according to an example embodiment of the present invention.

FIG. 6 depicts a flowchart of a method for training, testing, validating, or verifying the first model 402.

The method for training, testing, validating, or verifying the first model 402 may comprise a step 602.

The method may start with the trained first encoder 204.

The step 602 comprises mapping the first radar spectrum 204 with the first part 404 of the first model 402 to the first encoding 408 in the second feature space, The method comprises a step 604.

The step 604 comprises mapping the first encoding 206 in the first feature space with the second model 410 to the second encoding 412 in the second feature space.

The method comprises a step 606.

The step 606 comprises mapping the first encoding 408 in the second feature space and the second encoding 412 in the second features space with the second part 406 of the first model 402 to the output 414 of the first model 402.

The method comprises a step 608.

The step 608 comprises providing a ground truth for the output 414.

The method comprises a step 610.

The step 610 comprises training, testing, verifying or validating the first model 402 depending on a difference between the output 414 and the ground truth.

The output 414 and the ground truth for the first radar spectrum 204 characterizes for example at least one object that is detected in the radar spectrum, or an event that is recognized in the radar spectrum, or a segmentation of the radar spectrum.

The training may comprise repeating the steps 602 to 610 for a plurality of pairs of a first radar spectrum and a first digital image. The training may comprise evaluating the second loss 308, e.g., the cosine similarity.

The method ends after step 610 with a trained first model 402.

Figure 7:
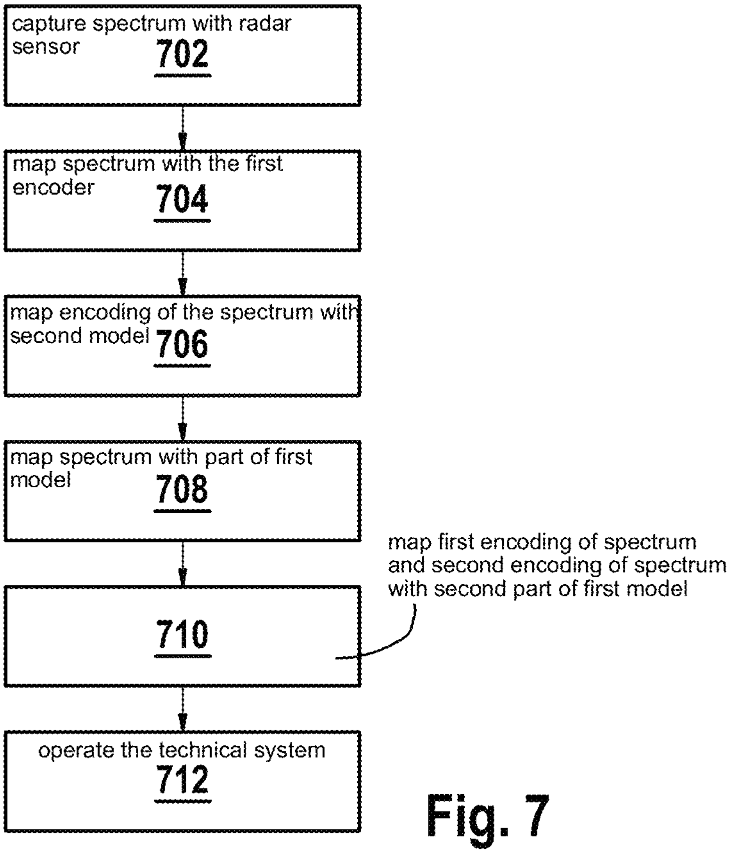
FIG. 7 depicts a flowchart of a method for object detection, for event recognition, or for segmentation with the first model, according to an example embodiment of the present invention.

FIG. 7 depicts a flowchart of a method for object detection, for event recognition, or for segmentation with the first model 402.

The method for object detection, for event recognition, or for segmentation may comprise a step 702.

The method may start with the step 702 and the trained first model 404.

The step 702 comprises capturing a spectrum with a radar sensor.

The method comprises a step 704.

The step 704 comprises mapping the spectrum with the first encoder 202 to an encoding of the spectrum in the first features space.

The method comprises a step 706.

The step 706 comprises mapping the encoding of the spectrum in the first feature space with the second model 410 to a first encoding of the spectrum in the second features space.

The method comprises a step 708.

The step 708 comprises mapping the spectrum with the part of the first model 402 to a second encoding of the spectrum in the second features space.

The method comprises a step 710.

The step 710 comprises mapping the first encoding of the spectrum in the second feature space and the second encoding of the spectrum in the second feature space with the second part of the first model 406 to the output of the first model 402.

The output 414 may characterize at least one object that is detected in the spectrum. The object may be a traffic sign, a road surface, a person, a pedestrian, an animal, a plant, a vehicle, a road object, a building.

The output 414 may characterize an event that is recognized in the spectrum. The event may be a state of a traffic sign, a gesture of a person.

The output 414 may characterize a segmentation of the spectrum, in particular with respect to a traffic sign, a road surface, a pedestrian, an animal, a vehicle, a road object, a building.

The method may comprise a step 712.

The step 712 comprises operating, in particular moving or stopping, the technical system 106 depending on the output 414.

For example, the technical system 106 is the vehicle, wherein the method comprises stopping the vehicle, in case the detected object is a traffic sign that indicates to stop, e.g., a stop sign, and moving the vehicle otherwise, or in case the detected object is a traffic sign that indicates to move, e.g., a right of way sign.

For example, the technical system 106 is the vehicle, wherein the method comprises stopping the vehicle, in case the detected event is state of a traffic sign that indicates to stop, e.g., a traffic light changing to a red light, and moving the vehicle otherwise, or in case the detected event is a state of a traffic sign that indicates to move, e.g., a traffic light changing to a green light.

The step 712 comprises operating the technical system 106 display the segmentation of the spectrum depending on the output 414.

The first encoder 202 may be a neural network. The second encoder 210 may be a neural network. The third encoder 304 may be a neural network. The second encoder 210 may be an image encoder of an image-language model, ILM. The third encoder 304 may be a CLIP text encoder of the ILM. The ILM and CLIP are described in Radford, Alec, Jong Wook Kim, Chris Hallacy, Aditya Ramesh, Gabriel Goh, Sandhini Agarwal, Girish Sastry, et al. "Learning Transferable Visual Models From Natural Language Supervision." arXiv, Feb. 26, 2021. doi.org/10.48550/arXiv.2103.00020.

Using the trained first encoder and the trained third encoder 304, related captions 302 and radar spectra 208 produce a similar embedding, in particular in the sense of cosine similarity. The trained first encoder and the trained third encoder 304 represent a spectra-language model that may be used, e.g., for data retrieval, or classification.

What is claimed is:

1. A computer-implemented method for training a first encoder for mapping radar spectra to encodings for training, or testing, or validating, or verifying a first model that is configured; (i) for object detection, or (ii) for event recognition, or (iii) for segmentation, the method comprising the following steps:

- providing the first encoder, wherein the first encoder is configured to map a first radar spectrum to a first encoding in a first feature space;
- providing a second encoder, wherein the second encoder is configured to map a first digital image to a second encoding in the first features space;
- providing the first radar spectrum and the first digital image, wherein the first radar spectrum includes a radar reflection of at least a part of a first object, wherein the first digital image depicts at least a part of the first object, and wherein the first radar spectrum and the first digital image represent the same real world scene;
- mapping the first radar spectrum with the first encoder to the first encoding;
- mapping the first digital image with the second encoder to the second encoding;
- training the first encoder and/or the second encoder depending on a distance between the first encoding and the second encoding;
- providing a third encoder that is configured to map captions to encodings in the first feature space;
- providing a caption of the first digital image;
- mapping the caption of the first digital image with the third encoder to a third encoding in the first feature space; and
- training the first encoder and/or the third encoder depending on a distance between the first encoding and the third encoding;
- wherein the providing of the caption of the first digital image includes:
  - determining a semantic segmentation, wherein the semantic segmentation associates a first part of the first digital image with a class name, the first part of the first digital image including a first pixel of the first digital image or a first segment of pixel of the first digital image, providing a template for the caption, wherein the template includes a part of a statement of the caption, and a first placeholder, and replacing the first placeholder in the template with the class name to create the statement.

2. A computer-implemented method for training a first encoder for mapping radar spectra to encodings for training, or testing, or validating, or verifying a first model that is configured: (i) for object detection, (ii) for event recognition, or (iii) for segmentation, the method comprising the following steps:

providing the first encoder, wherein the first encoder is configured to map a first radar spectrum to a first encoding in a first feature space;

providing a second encoder, wherein the second encoder is configured to map a first digital image to a second encoding in the first features space;

providing the first radar spectrum and the first digital image, wherein the first radar spectrum includes a radar reflection of at least a part of a first object, wherein the first digital image depicts at least a part of the first object, and wherein the first radar spectrum and the first digital image represent the same real world scene, preferably at the same time;

mapping the first radar spectrum with the first encoder to the first encoding;

mapping the first digital image with the second encoder to the second encoding;

training the first encoder and/or the second encoder depending on a distance between the first encoding and the second encoding;

providing a third encoder that is configured to map captions to encodings in the first feature space;

providing a second radar spectrum and a second digital image, wherein the second digital image depicts at least a part of the first object or a second object, wherein the second radar spectrum comprises a radar reflection of at least a part of the first object or the second object, wherein the second radar spectrum and the second digital image represent the same real world scene;

providing a caption of the second digital image;

mapping the caption of the second digital image with the third encoder to a third encoding in the first feature space;

training the first encoder and/or the third encoder depending on a distance between the first encoding and the third encoding;

wherein the providing of the caption of the second digital image includes:

determining a semantic segmentation, wherein the semantic segmentation associates a first part of the second digital image with a class name, the first part of the second digital image including a first pixel of the second digital image or a first segment of pixel of the second digital image, providing a template for the caption, wherein the template includes a part of a statement of the caption, and a first placeholder, and replacing the first placeholder in the template with the class name to create the statement.

3. The method according to claim 1, wherein:

the providing of the caption of the first digital image includes:

providing a set of class names, providing a set of categories, wherein at least one class name of the set of class names, is associated with at least one category of the set of categories;

the providing of the template includes providing the template with the first placeholder for a category of the set of categories;

providing the caption of the first digital image includes:

associating at least one part of the first digital image with a class name of the set of class names, the at least one part of the first digital image including at least one pixel of the first digital image or at least one segment of pixel of the first digital image, replacing the placeholder for the category with a first class name that is associated with the category, and that is associated with the at least one part of the first digital image, to create a first statement of the caption of the first digital image, and replacing the placeholder for the category with a second class name that is associated with the category, and that is associated with the at least one part of the first digital image, to create a second statement of the caption of the first digital image.

4. The method according to claim 2, wherein the providing of the caption of the second digital image includes:

associating at least one part of the second digital image with a class name of the set of class names, the at least one part of the second digital image including at least one pixel of the second digital image or at least one segment of pixel of the second digital image, replacing the placeholder for the category with a first class name that is associated with the category, and that is associated with the at least one part of the second digital image, to create a first statement of the caption of the second digital image, and replacing the placeholder for the category with a second class name that is associated with the category, and that is associated with the at least one part of the second digital image to create a second statement of the caption of the second digital image.

5. The method according to claim 1, wherein:

the providing of the first digital image includes providing depth information that is associated with pixels of the first digital image;

the providing of the caption of the first digital image includes:

providing a set of attributes that describe a position of an relative to another object that is depicted in the first digital image, determining a position of the first object relative to another object that is depicted in the first digital image, depending on the depth information that is associated with at least a part of the pixels that depict the first object and the depth information that is associated with at least a part of the pixels that depict the other object, selecting an attribute from the set of attributes depending on the position, providing the template with two first placeholders and a second placeholder for an attribute of the set of attribute, replacing the second placeholder with the attribute, and replacing the two first placeholders with the class name of the first object, and the other object respectively.

6. The method according to claim 2, wherein:

the providing of the second digital image includes providing depth information that is associated with pixels of the second digital image;

the providing of the caption of the second digital image includes:

providing a set of attributes that describe a position of an object relative to another object that is depicted in the second digital image, determining a position of the second object relative to another object that is depicted in the second digital image, depending on the depth information that is associated with at least a part of the pixels that depict the second object and the depth information that is associated with at least a part of the pixels that depict the other object, selecting an attribute from the set of attributes depending on the position, providing the template with two first placeholders and a second placeholder for an attribute of the set of attribute, replacing the second placeholder with the attribute, and replacing the two first placeholders with the class name of the first object, and the other object respectively.

7. The method according to claim 1, wherein the providing of the caption includes:

providing a set of templates for statements, wherein the templates in the set of templates include the first placeholder and a part of a respective statement, and selecting the template for the caption from a set of templates in particular randomly.

8. The method according to claim 1, further comprising:

mapping the first radar spectrum, with a first part of the first model that is configured to map radar spectra to encodings in a second feature space, to a first encoding in the second feature space;

mapping the first encoding in the first feature space, with a second model that is configured to map encodings in the first features space to encodings in the second feature space, to a second encoding in the second feature space;

mapping the first encoding in the second feature space and the second encoding in the second features space with a second part of the first model to an output of the first model;

providing a ground truth for the output;

training the first model depending on difference between the output and the ground truth, wherein the output and the ground truth characterizes: (i) at least one object that is detected in the radar spectrum, or (ii) an event that is recognized in the radar spectrum, or (iii) a segmentation of the radar spectrum.

9. The method according to claim 2, further comprising:

mapping the second digital image, with a first part of the first model that is configured for mapping digital images to encodings in a second feature space, to a first encoding in the second feature space;

mapping the first encoding, with a second model that is configured to map encodings from the first feature space to encodings in the second feature space, to a second encoding in the second features space;

mapping the first encoding in the second feature space and the second encoding in the second features space with a second part of the first model to an output of the first model;

providing a ground truth for the output;

training the first model depending on difference between the output and the ground truth, wherein the output and the ground truth characterizes: (i) at least one object that is detected in the radar spectrum, or (ii) an event that is recognized in the radar spectrum, or (iii) a segmentation of the radar spectrum.

10. The method according to claim 1, further comprising:

providing a third radar spectrum;

mapping the third radar spectrum with the first encoder to an encoding of the third radar spectrum in the first feature space;

mapping the third radar spectrum, with a first part of the first model that is configured to map radar spectra to encodings in a second feature space, to a first encoding in the second feature space;

mapping the encoding of the third radar spectrum in the first feature space, with a second model that is configured to map encodings in the first features space to encodings in the second feature space, to a second encoding in the second feature space;

mapping the first encoding in the second feature space and the second encoding in the second features space with a second part of the first model to an output of the first model;

providing a ground truth for the output;

training the first model depending on difference between the output and the ground truth, wherein the output and the ground truth characterizes: (i) at least one object that is detected in the radar spectrum, or (ii) an event that is recognized in the radar spectrum, or (iii) a segmentation of the radar spectrum.

11. The method according to claim 8, further comprising:

capturing the first radar spectrum with a radar sensor;

mapping the first encoding in the first feature space with the second model to a first encoding in the second feature space;

mapping the first radar spectrum with the first part of the first model to a second encoding of the first radar spectrum in the second feature space;

mapping the first encoding of the first radar spectrum in the second feature space and the second encoding of the first radar spectrum in the second feature space with the second part of the first model to the output of the first model that characterizes: (i) at least one object that is detected in the first radar spectrum, the at least one object including a traffic sign or a road surface or a person or a pedestrian or an animal or a plant or a vehicle or a road object or a building, or (ii) an event that is recognized in the first radar spectrum, including a state of a traffic sign or a gesture of a person, or (iii) a segmentation of the first radar spectrum including with respect to a traffic sign or a road surface or a pedestrian or an animal or a vehicle or a road object or a building.

12. The method according to claim 11, further comprising:

operating, including moving or stopping, a technical system, the technical system including a computer-controlled machine, including a robot or a vehicle or a manufacturing machine or a household appliance or a power tool or an access control system or a personal assistant or a medical imaging system.

13. A device configured to train a first encoder for mapping radar spectra to encodings for training, or testing, or validating, or verifying a first model that is configured: (i) for object detection, or (ii) for event recognition, or (iii) for segmentation, the device comprising:

at least one processor; and at least one memory, wherein the at least one processor is configured to execute instructions that, when executed by the at least one processor, cause the device to perform the following steps:

providing the first encoder, wherein the first encoder is configured to map a first radar spectrum to a first encoding in a first feature space, providing a second encoder, wherein the second encoder is configured to map a first digital image to a second encoding in the first features space, providing the first radar spectrum and the first digital image, wherein the first radar spectrum includes a radar reflection of at least a part of a first object, wherein the first digital image depicts at least a part of the first object, and wherein the first radar spectrum and the first digital image represent the same real world scene, mapping the first radar spectrum with the first encoder to the first encoding, mapping the first digital image with the second encoder to the second encoding, training the first encoder and/or the second encoder depending on a distance between the first encoding and the second encoding, providing a third encoder that is configured to map captions to encodings in the first feature space; providing a caption of the first digital image, mapping the caption of the first digital image with the third encoder to a third encoding in the first feature space, and training the first encoder and/or the third encoder depending on a distance between the first encoding and the third encoding, wherein the providing of the caption of the first digital image includes:

determining a semantic segmentation, wherein the semantic segmentation associates a first part of the first digital image with a class name, the first part of the first digital image including a first pixel of the first digital image or a first segment of pixel of the first digital image, providing a template for the caption, wherein the template includes a part of a statement of the caption, and a first placeholder, and replacing the first placeholder in the template with the class name to create the statement;

wherein the at least one memory stores the instructions.

14. The device according to claim 13, further comprising:

a radar sensor that is configured to capture a radar spectrum;

wherein the device is configured to determine an output of the first model that characterizes: (i) at least one object that is detected in the spectrum including a traffic sign or a road surface or a person or a pedestrian or an animal or a plant or a vehicle or a road object or a building, or (ii) an event that is recognized in the spectrum including a state of a traffic sign or a gesture of a person, or (iii) a segmentation of the spectrum including with respect to a traffic sign or a road surface or a pedestrian or an animal or a vehicle or a road object or a building, and wherein the device is configured to operate, including to move or stop, a technical system, the technical system including a computer-controlled machine, including a robot or a vehicle or a manufacturing machine or a household appliance or a power tool or an access control system or a personal assistant or a medical imaging system, depending on the output.

15. A non-transitory computer-readable medium on which is stored a computer program for training a first encoder for mapping radar spectra to encodings for training, or testing, or validating, or verifying a first model that is configured; (i) for object detection, or (ii) for event recognition, or (iii) for segmentation, the computer program, when executed by a computer, causing the computer to perform the following steps:

providing the first encoder, wherein the first encoder is configured to map a first radar spectrum to a first encoding in a first feature space;

providing a second encoder, wherein the second encoder is configured to map a first digital image to a second encoding in the first features space;

providing the first radar spectrum and the first digital image, wherein the first radar spectrum includes a radar reflection of at least a part of a first object, wherein the first digital image depicts at least a part of the first object, and wherein the first radar spectrum and the first digital image represent the same real world scene;

mapping the first radar spectrum with the first encoder to the first encoding;

mapping the first digital image with the second encoder to the second encoding;

training the first encoder and/or the second encoder depending on a distance between the first encoding and the second encoding;

providing a third encoder that is configured to map captions to encodings in the first feature space;

providing a caption of the first digital image;

mapping the caption of the first digital image with the third encoder to a third encoding in the first feature space; and training the first encoder and/or the third encoder depending on a distance between the first encoding and the third encoding;

wherein the providing of the caption of the first digital image includes:

determining a semantic segmentation, wherein the semantic segmentation associates a first part of the first digital image with a class name, the first part of the first digital image including a first pixel of the first digital image or a first segment of pixel of the first digital image, providing a template for the caption, wherein the template includes a part of a statement of the caption, and a first placeholder, and replacing the first placeholder in the template with the class name to create the statement.

* * * * *